United States Patent [19]

Muramatsu

[11] Patent Number: 4,878,387
[45] Date of Patent: Nov. 7, 1989

[54] AUTOMOTIVE INSTRUMENT

[75] Inventor: Masahiro Muramatsu, Shizuoka, Japan

[73] Assignee: Yazaki Corporation, Tokyo, Japan

[21] Appl. No.: 149,604

[22] Filed: Jan. 28, 1988

[30] Foreign Application Priority Data

Feb. 24, 1987 [JP] Japan ............................ 62-25040[U]

[51] Int. Cl.4 ........................................... G01D 11/28
[52] U.S. Cl. .................................... 73/866.3; 73/499; 116/62.4; 340/815.15; 362/30
[58] Field of Search ..................... 73/866.3, 493, 431; 116/62.4, 280; 362/29, 30; 340/52 F, 815.02, 815.06, 815.15, 815.2

[56] References Cited

U.S. PATENT DOCUMENTS 2,831,453  4/1958  Hardesty ..................... 116/DIG. 6
3,161,062  12/1964  Huston ................................. 362/29
4,236,480  12/1980  Gröhl ................................... 362/29
4,447,860  5/1984  Stone et al. ........................... 362/30

FOREIGN PATENT DOCUMENTS 2913138  10/1979  Fed. Rep. of Germany .
2925083  1/1980  Fed. Rep. of Germany .
3215184  10/1983  Fed. Rep. of Germany .

OTHER PUBLICATIONS

Patents Abstracts of Japan, P-381, Aug. 21, 1985, vol. 9/No. 203 60-67823(A) Appln. No. 58-175782.

Primary Examiner—John Chapman
Assistant Examiner—Michell Simons
Attorney, Agent, or Firm—Robbins & Laramie

[57] ABSTRACT

An automotive instrument having a meter scale plate and an indicator lens which are arranged in a side-by-side fashion on the same display panel. A light-shielding projecting wall is provided on the rear side of the meter plate constituting the display panel, so as to prevent the light illuminating the meter scale plate to leak into the area of the indicator lens. A light-shielding structure is provided on a case of the instrument so as to shield the end of the light-shielding projecting wall, thereby preventing the meter illuminating light from leaking to the area of the indicator lens.

2 Claims, 3 Drawing Sheets

AUTOMOTIVE INSTRUMENT

BACKGROUND OF THE INVENTION

1. Field of the Invention

The present invention relates to a meter device for automobiles (referred to as automotive instrument hereinafter) and, more particularly, to an integrated automotive instrument in which meter scale plates such as of a speed meter, a tachometer and so forth and a lens of a warning indicator are disposed on the same display panel in a side-by-side fashion.

2. Description of the Prior Art

Such an automotive instrument has been known as having a case accommodating the main part of the instrument, a meter plate provided on the front side of the case and constituting a display panel, and a cover which covers the meter plate. The meter plate carries a meter scale plate and an indicator lens in a side-by-side fashion. An instrument mechanism and a light source are disposed behind the meter sale plate, so as to illuminate the scale plate from the rear side thereof. A part of the light from the scale plate is transmitted to the hand of the meter through a light-conducting plate thereby illuminating the hand.

An indicator light source is disposed behind the indicator lens so as to illuminate the latter. The indicator lens and the meter scale plate are separated from each other by a partition wall provided on the case.

This known automotive instrument has a drawback in that, when the light sources are turned on during cruising in the night or in the dark, the light for illuminating the meter scale plate tends to leak to the indicator area through a minute gap between the meter plate and the indicator lens.

In order to avoid this problem, hitherto, it has been proposed to form a light-shielding wall protruding from the rear side of the meter plate. Such a light-shielding wall, however, cannot perfectly prevent the leak of light. Namely, a small portion of the light undesirably leaks to impinge upon the indicator lens through a minute gap between the light-shielding wall and the partition wall or between the light shielding wall and the rear side of the meter plate, with an undesirable effect that the indicator is illuminated in an obscure manner even when the indicator is not operating.

SUMMARY OF THE INVENTION

Accordingly, an object of the present invention is to provide an automotive instrument which is improved such as to prevent the meter illuminating light from leaking to the indicator area, thereby overcoming the above-described problem of the prior art.

To this end, according to the present invention, there is provided an automotive instrument having a case, a meter plate providing a display panel and carrying a meter scale plate and an indicator lens arranged in a side-by-side fashion a light-shielding projecting wall projecting from the rear side of the portion of the meter plate which is located on the front side and near the indicator lens, so as to prevent any portion of the light illuminating the meter scale plate from leaking through a gap between the indicator lens and the meter plate to reach the indicator lens; and a light-shielding structure arranged to shield the end of the light-shielding projecting wall from the light for illuminating the meter scale plate.

DESCRIPTION OF THE PREFERRED EMBODIMENT

Figure 4:
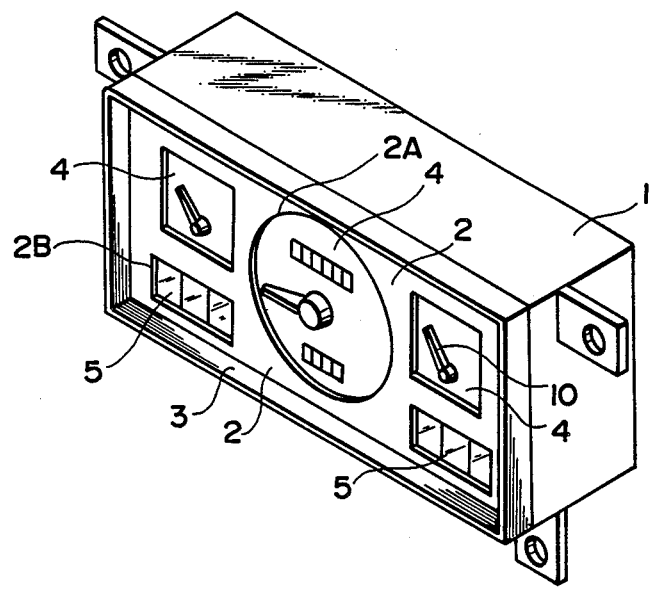
FIG. 4 is a schematic illustration of an automotive instrument in accordance with the present invention.

FIG. 4 is a schematic illustration of an automotive instrument. The instrument has a case 1 which accommodates the main part of the instrument, a meter plate 2 provided on the front side of the case 1 and providing a display panel, and a case cover 3 covering the meter plate 2. The meter plate 2 has an opening 2A through which a meter scale plate 4 carrying a speed meter scale and a tachometer scale is exposed, and an opening 2B through which an indicator lens 5 for indicators such as a battery check, door closing check and so forth is exposed.

Figure 5:
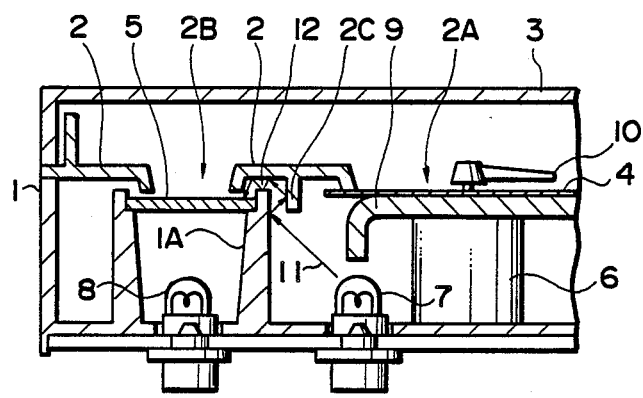
FIG. 5 is a sectional view of a conventional automotive instrument.

FIG. 5 is a sectional view of a conventional automotive instrument. As will be seen from this figure, the meter scale plate 4 and the indicator lens 5 are disposed in a side-by-side fashion. An instrument mechanism 6 and a light source 7 are disposed behind the meter scale plate 4, while an indicator source 8 is disposed behind the indicator lens 5. The indicator lens 5 and the meter scale plate 4 are separated from each other by a partition all 1A projecting from the case 1, so that the light from the light source 8 can illuminate only the indicator lens 5, while the light from the light source 7 illuminates the scale plate 4 from the rear side thereof, as well as a hand or pointer 1 of meters through a light conducting plate 9.

In this known automotive instrument, there is a minute gap 12 between the meter plate 2 and the partition wall 1A and also between the meter plate 2 and the indicator lens 5. During night cruising of the automobile, the light source 7 is turned on to illuminate the scale plates 4 and the pointer 10. A portion of the light 11 from the light source 7 undesirably leaks through the above-mentioned minute gap 12 to reach the indicator lens 5. In order to eliminate this problem, it has been proposed to form a light-shielding projecting wall 2C on the rear side of the meter plate 2 so as to interrupt the portion of the light 11 which tends to leak through the gap 12. This countermeasure, however, is still unsatisfactory in that the illumination light 11 is reflected and scattered in the spaces between the light-shielding projection wall 2C and the partition wall 1A and between the rear side of the meter plate 2 and the partition wall 1A, so that the light-shielding projecting wall 2C cannot perfectly eliminate the leakage of the light to the indicator lens 5.

Figure 1:
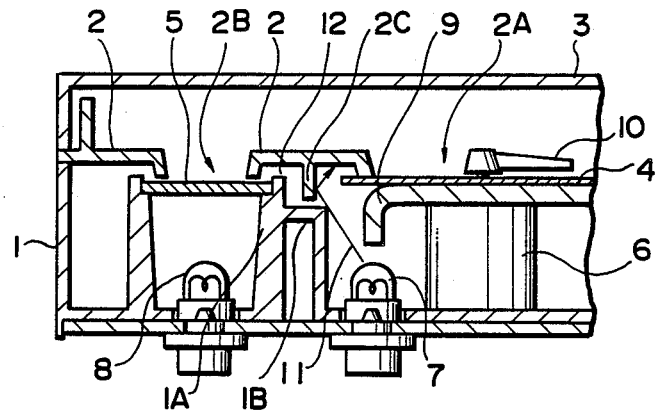
FIG. 1 is a sectional view of an embodiment of the automotive instrument in accordance with the present invention.

FIG. 1 shows an embodiment of the automotive instrument in accordance with the present invention. This automotive instrument has a case 1 on the front side (the side adjacent to the driver, i.e., the upper side as viewed in FIG. 1) of which is provided a meter plate 2 which presents a display panel. A case cover 3 is attached on the front side of the case 1 so as to cover the meter plate 2. A meter scale plate 4 and an indicator lens 5 are mounted on the display panel in a side-by-side fashion to each other. A light-shielding projecting wall 2C is formed on the rear side (lower side as viewed in FIG. 1) of a portion of the meter plate 2 which is on the front side (upper side as viewed in FIG. 11) of the indicator lens 5. The automotive instrument of this embodiment further has a light-shielding structure 1B of an L-shaped cross-section formed on the side of the partition wall 1A adjacent to the light source 7. The light-shielding structure 1B has a lateral portion which extends laterally as viewed in FIG. 1 in the vicinity of the end of the light-shielding projecting wall 2C, and a vertical portion which extends vertically from the end of the lateral portion. The L-shaped light-shielding structure 1B prevents the light of the light source 7 from directly impinging upon the end of the light-shielding projecting wall 2C, thus preventing the light from leaking through the gap 12.

Figure 2:
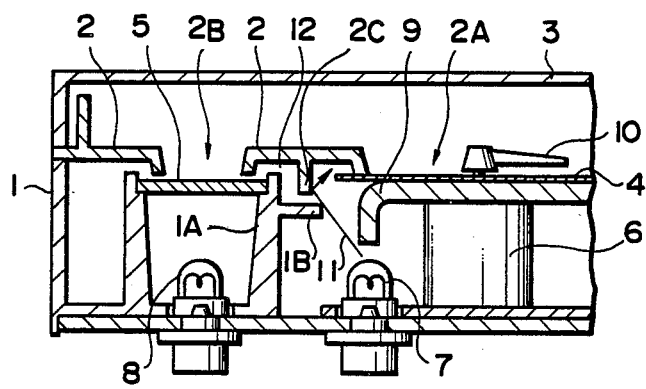
FIG. 2 is a sectional view of another embodiment of the automotive instrument in accordance with the present invention.

FIG. 2 shows a second embodiment of the automotive instrument of the present invention in which a light-shielding structure 1B is constituted by a lateral projection which projects from an upper portion of the partition wall 1A laterally in the vicinity of the end of the light-shielding projecting wall 2C. The light-shielding structure 1B cooperates with the light-shielding projecting wall 2C so as to prevent the light from the light source 7 to reach the gap 12.

Figure 3:
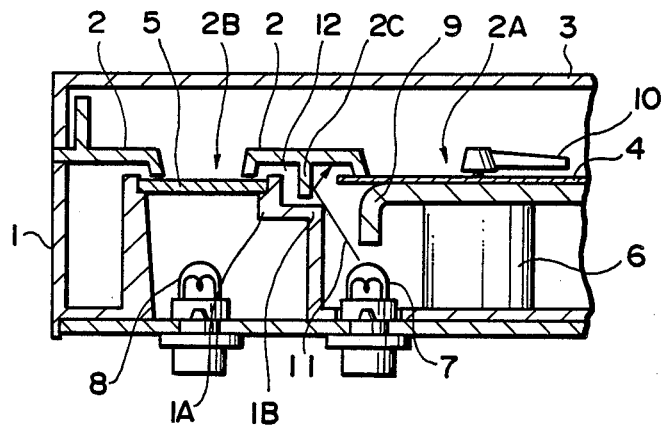
FIG. 3 is a sectional view of still another embodiment of the automotive instrument in accordance with the present invention.

FIG. 3 shows a third embodiment of the automotive instrument of the present invention in which the partition wall 1A itself is constructed to have an L-shaped cross-section, and a laterally extending portion of this L-shaped partition wall 1A is positioned in the vicinity of the projecting wall 2C so as to constitute a light-shielding structure 1B. In this case, the light-shielding structure 1B constitutes a portion of the case 1. This arrangement is equivalent to that shown in FIG. 1 in regard to the relative position between the light-shielding structure and the light source 7.

As has been described, according to the present invention, it is possible to prevent the light illuminating meter scale plates from leaking to the indicator lens during night cruising of the automobile, whereby the state of display on the automotive instrument is improved. In addition, no substantial rise in the production cost is incurred since the light-shielding structure is constructed as a unit with the case of the instrument.

What is claimed is:

1. In an automotive instrument having a case, a meter plate providing a display panel and carrying a meter scale plate and at least one, indicator lens, wherein said meter scale plate and indicator lens are arranged in side-by-side configuration and separated from the meter plate by a gap, and a light source for illuminating the meter scale plate, the improvement comprising:

a light-shielding projecting wall projecting from a rear side of said meter plate, so as to prevent a portion of light from said light source for illuminating said meter scale plate from leaking through said gap to reach said indicator lens; and a light-shielding structure positioned transverse to the projecting wall and the light source for illuminating the meter scale plate, so as to prevent the remaining portion of light from said light source for illuminating said meter scale plate from leaking through said gap to reach the indicator lens.

2. An automotive instrument according to claim 1, wherein said light-shielding structure is an integral part of said case.

* * * * *